US009944393B1

(12) United States Patent  (10) Patent No.: US 9,944,393 B1
Lorence                        (45) Date of Patent: Apr. 17, 2018

(54) NARROW-OUTLET SPLITTER FOR A PERSONAL PROPULSION SYSTEM

(71) Applicant: FlyDive, Inc., San Diego, CA (US)

(72) Inventor: Ryan Lorence, San Diego, CA (US)

(73) Assignee: FlyDrive, Inc., San Diego, CA (US)

( * ) Notice: Subject to any disclaimer, the term of this patent is extended or adjusted under 35 U.S.C. 154(b) by 0 days.

(21) Appl. No.: 14/941,660

(22) Filed: Nov. 16, 2015

Related U.S. Application Data

(60) Provisional application No. 62/158,198, filed on May 7, 2015.

(51) Int. Cl.
*B64C 39/02* (2006.01)
*F16L 41/02* (2006.01)
*B64C 15/02* (2006.01)
*B63H 11/107* (2006.01)

(52) U.S. Cl.
CPC .......... *B64C 39/026* (2013.01); *B63H 11/107* (2013.01); *B64C 15/02* (2013.01); *F16L 41/02* (2013.01)

(58) Field of Classification Search
CPC . F16L 9/006; F16L 11/22; F16L 41/02; F16L 41/023; F16L 43/001; B64C 27/18; B64C 27/24; B64C 39/026; B64C 15/00; B64C 15/02; B64C 15/12; B64C 15/14; B63H 11/08; B63H 11/107; B63H 11/113
See application file for complete search history.

(56) References Cited

U.S. PATENT DOCUMENTS

| 3,381,917 | A | * | 5/1968 | Moore | B64C 39/026 244/4 A |
| 3,443,775 | A | * | 5/1969 | Williams | B64C 39/026 244/4 A |
| RE26,756 | E | * | 1/1970 | Moore et al. | B64C 39/026 244/4 R |
| 3,809,005 | A | * | 5/1974 | Rodler, Jr. | B63H 11/08 114/151 |
| 4,371,314 | A | * | 2/1983 | Dauel | B64C 27/18 416/102 |
| 6,027,146 | A | * | 2/2000 | Kurimoto | F01N 13/08 285/131.1 |
| 7,258,301 | B2 | * | 8/2007 | Li | A63B 35/00 114/315 |
| 8,336,805 | B1 | * | 12/2012 | Zapata | B64C 39/026 114/315 |
| 9,145,206 | B1 | * | 9/2015 | Robinson | B63B 9/00 |
| 9,168,991 | B2 | * | 10/2015 | Zapata | B63B 35/731 |
| 9,381,787 | B2 | * | 7/2016 | Vignali | B60H 1/00564 |
| 9,387,914 | B2 | * | 7/2016 | Hubbard, Jr. | B63H 11/113 |

(Continued)

*Primary Examiner* — Joseph W Sanderson
(74) *Attorney, Agent, or Firm* — Michael D. Eisenberg

(57) ABSTRACT

A novel two-way splitter having reduced distance between outlets, while enabling smooth, efficient fluid flow (e.g., water flow) is provided. In a variant, the splitter includes a first pipe and a second pipe meeting at an interface near the inlet and extending away from the inlet, wherein portions of the first pipe and the second pipe proximal to the inlet are substantially helical and are intertwined with each other. In another variant, the first and second pipes have first portions proximal to the inlet which extend vertically side by side away from the inlet, such that the width of each first portion decreases and the depth of each first portion increases as a vertical distance from the inlet increases.

12 Claims, 8 Drawing Sheets

(56) References Cited

U.S. PATENT DOCUMENTS

| | | | |
|---|---|---|---|
| 9,440,743 B2* | 9/2016 | Mansfield-Marcoux | F16L 41/023 |
| 9,555,863 B2* | 1/2017 | Robinson | B63B 35/73 |
| 2006/0054735 A1* | 3/2006 | Li | A63B 35/00 244/4 A |
| 2013/0099027 A1* | 4/2013 | Li | B28B 19/0092 239/601 |
| 2014/0045415 A1* | 2/2014 | Mansfield-Marcoux | F16L 41/023 454/76 |
| 2014/0120821 A1* | 5/2014 | Vignali | F16L 41/023 454/76 |
| 2015/0028161 A1* | 1/2015 | Parks | B63H 11/04 244/23 R |
| 2015/0375833 A1* | 12/2015 | Robinson | B63B 35/73 441/65 |

* cited by examiner

NARROW-OUTLET SPLITTER FOR A PERSONAL PROPULSION SYSTEM

CROSS-REFERENCES TO RELATED APPLICATIONS

The present application claims priority to U.S. Provisional Application Ser. No. 62/158,198 filed on May 7, 2015, which is hereby incorporated herein by reference in its entirety.

TECHNICAL FIELD

The present invention, in some embodiments thereof, relates to devices and systems based on water jet for propelling a user to fly above a surface.

BACKGROUND OF THE INVENTION

Flight has always been a dream of mankind. In modern history, this dream has been achieved, and various flying vehicles have been produced to enable people to fly. Generally, these vehicles, such as airplanes or helicopters, enclose the user (pilot or passenger) and allow little freedom to the passenger's control of the flight.

Some personal propulsion systems have been designed to carry a single person while providing the user increased control of the user's flight via motion of the user's body.

U.S. Pat. No. 8,336,805 describes a propulsion device comprising a body arranged for receiving a passenger and engaging with a thrust unit supplied with a pressurized fluid from a compression station. The arrangement of such a device offers great freedom of movement through the air or under the surface of a fluid. U.S. Pat. No. 8,336,805 also discloses a propulsion system in which the compression station can be remote in the form of a motorized marine vehicle.

BRIEF SUMMARY OF EMBODIMENTS OF THE INVENTION

The aim of the present invention is to increase the user's freedom of movement while using a personal propulsion system. Another aim of the present invention is to improve stability a personal propulsion system.

FIG. 1 illustrates a personal propulsion system 100 as known in the prior art. A pump 102 pumps a fluid 122 (e.g., water) from a fluid reservoir (e.g., sea, lake, pool), and sends a fluid flow 124 through a flexible tube 106. The tube is connected to a splitter 109, which is attached to two nozzles 110 and 111. The splitter 109 splits the flow 124 into two flows that enter the nozzles and are ejected as flows 126 and 128. The nozzles 110 and 111 are located below a platform 113 which supports the user, and face away from the user. In this manner the nozzles 110 and 111 eject fluid flows 126 and 128 away from the user, and propel the user in a direction opposite to that of from the ejected fluid's flow. The user can change the orientation of the nozzles by changing the orientation of his or her body. In some embodiments, the platform 113 is replaced by two separate platforms or foot mounts, each associated with a respective nozzle. Each platform or foot mount is joined to a respective foot of the user.

The inventor has found that reducing the spacing between the outlets of a two-way splitter improves the performance and handling of the personal propulsion system. Commonly, reducing the spacing between the outlets of the splitter entails increasing/sharpening the curvature of the pipes that make up the splitter. This, however, generally introduces turbulence in the flow of the fluid, and degrades the performance of the system.

Thus, an aim of the present invention is to provide a novel two-way splitter having reduced distance between outlets, while enabling smooth, efficient fluid flow (e.g., water flow).

Therefore, an aspect of some embodiments of the present invention relates to a flow splitter configured for splitting a first fluid flow into two second flows and for changing a direction of each second flow with respect to a direction of the first flow. The flow splitter comprises an inlet, configured for receiving the first flow, and a first pipe and a second pipe meeting at an interface near the inlet and extending away from the inlet, such that the interface divides a first cross-sectional area of the inlet into two second cross-sectional areas. Portions of the first pipe and the second pipe proximal to the inlet are substantially helical and are intertwined with each other. The first pipe and the second pipe have a first outlet and a second outlet respectively at ends of the respective pipes, the first and second outlet facing away from each other.

In a variant, central axes of the first and second pipe at the outlets form substantially right angles with a central axis of the splitter at the inlet.

Optionally, central axes of the first and second pipe at the outlets form an angle of about 180 degrees between each other.

In another variant, a cross-sectional surface of the inlet is circular or oval, such that cross sectional surfaces of the pipes at the inlets are D-shaped. The cross-sectional surface of each pipe smoothly morphs from the D-shape into an oval shape at the respective outlet.

In yet another variant, a cross-sectional surface of the inlet is circular or oval, such that cross sectional surfaces of the pipes at the inlets are D-shaped. The cross-sectional surface of each pipe smoothly morphs from the D-shape into an oval shape along the pipe. The cross-sectional surface of each pipe smoothly morphs from the oval shape along the pipe to a circular shape at the respective outlet.

In a further variant, the interface is a panel extending between two points of a circumference of the inlet.

Optionally, the interface has an aerodynamic shape, configured for maintaining low drag in the second flows.

Optionally, an edge of the interface proximal to the inlet has a frontal cross section perpendicular to the interface's larger surface having a parabola's shape, such that a vertex of the parabola is a point of the interface that is farthest from the outlets.

In yet a further variant, a cross sectional of each pipe is about constant along at least a portion of the respective pipe.

Another aspect of some embodiments of the present invention relates to a flow splitter configured for splitting a first fluid flow into two second flows and for changing a direction of each second flow with respect to a direction of the first flow. The flow splitter comprises: an inlet, configured for receiving the first flow. A first pipe and a second pipe meeting at an interface near the inlet and extending away from the inlet, such that the interface divides a first cross-sectional area of the inlet into two second cross-sectional areas. The first and second pipes have first portions proximal to the inlet which extend vertically side by side away from the inlet, and second portions distal from the inlet which curve from each other at respective angles and end at respective outlets. For each of the first portions, a width for any vertical point is the largest horizontal distance perpendicular to the interface between the interface and an inner surface of the pipe. For each of the first portions, a depth for any vertical point is the largest horizontal distance parallel to the interface between two points at an inner surface of the pipe. For each of the first portions, the width decreases and the depth increases as a vertical distance from the inlet increases.

In a variant, a cross-sectional area of the each pipe is substantially constant along the respective pipe.

In another variant, central axes of the first and second pipe at the outlets form substantially right angles with a central axis of the splitter at the inlet.

Optionally, central axes of the first and second pipe at the outlets form an angle of about 180 degrees with each other.

In another variant, the interface is a panel extending between two points of a circumference of the inlet.

Optionally, the interface has an aerodynamic shape, configured for maintaining low drag in the second flows.

Optionally, an edge of the interface proximal to the inlet has a frontal cross section perpendicular to the interface's larger surface having a parabola's shape, such that a vertex of the parabola is a point of the interface that is farthest from the outlets.

According to some embodiments of the present invention relates to an apparatus for a personal propulsion system. The apparatus comprising: a helical flow splitter described above having a diameter of about 4 inches at the inlet and a distance between outlets of about 6 inches, and two nozzles attached to the respective outlets of the flow splitter, the nozzles configured for receiving the fluid from the flow splitter and having respective exits for emitting respective jets at a angles substantially perpendicular to the central axes of the first and second tubes at the outlets. A distance between the exits of two nozzles is equal to or less than about 27 inches.

In a variant, the apparatus includes two foot mounts, each foot mount being configured for being secured to a respective foot of a user, and each foot mount being joined to a respective nozzle and/or to a respective bearing which joins the respective nozzle to the respective outlet, wherein each nozzle exit is vertically aligned with a respective foot mount.

In another variant, the apparatus includes two foot mounts, each foot mount being configured for being secured to a respective foot of a user, and each foot mount being joined to a respective nozzle and/or or to a respective bearing which joins the respective nozzle to the respective outlet. A distance between any nozzle exit and a central axis of the flow splitter at the intake is smaller than a distance between a center of any of the foot mounts and the central axis.

According to some embodiments of the present invention relates to an apparatus for a personal propulsion system. The apparatus includes: a flat flow splitter as described above having a diameter of about 4 inches at the inlet and a distance between outlet of about 6 inches, and two nozzles attached to the respective outlets of the flow splitter, the nozzles configured for receiving the fluid from the flow splitter and having respective exits for emitting respective jets at a angles substantially perpendicular to the central axes of the first and second tubes at the outlets. A distance between the two nozzles is equal to or less than about 27 inches.

In a variant, the apparatus includes two foot mounts, each foot mount being configured for being secured to a respective foot of a user, and each foot mount being joined to a respective nozzle and/or to a respective bearing which joins the respective nozzle to the respective outlet, wherein each nozzle exit is vertically aligned with a respective foot mount.

In another variant, the apparatus includes two foot mounts, each foot mount being configured for being secured to a respective foot of a user, and each foot mount being joined to a respective nozzle and/or to a respective bearing which joins the respective nozzle to the respective outlet, wherein a distance between any nozzle exit and a central axis of the flow splitter at the intake is smaller than a distance between a center of any foot mount and the central axis.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 8-10 are schematic drawings illustrating user-side apparatuses of a personal propulsion system, each having a respective different configuration of the platforms joined to the user's feet in.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Before describing embodiments of the present invention, it should be noted, that the terms "cross-sectional area" and "cross-sectional surface" of a pipe refer to the surface of a pipe that is perpendicular to the central axis of the pipe.

Figure 2:
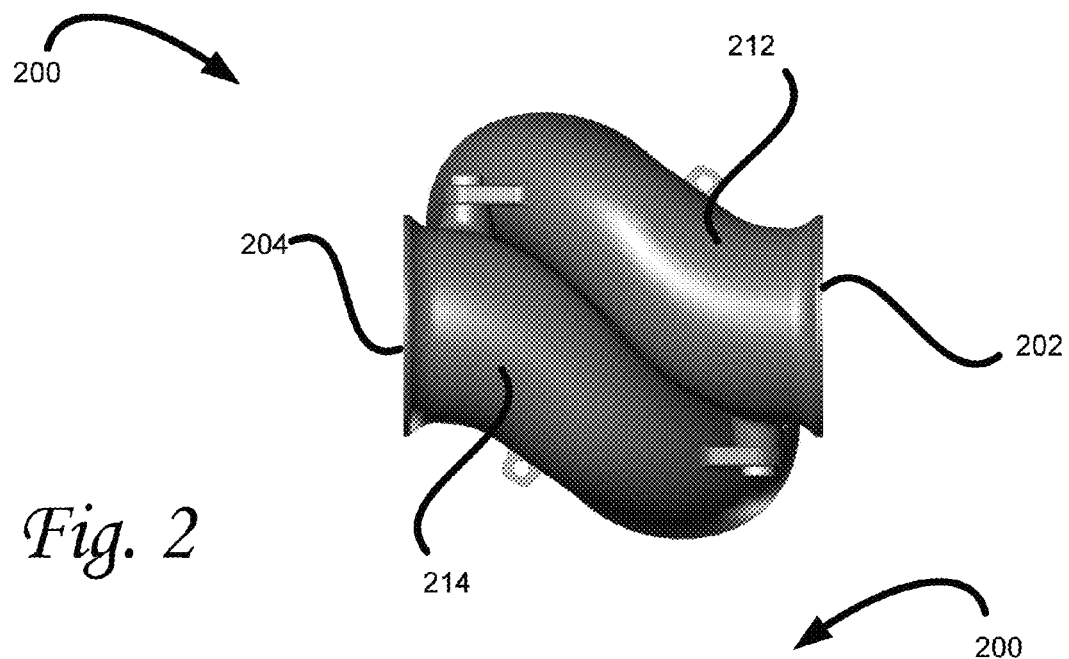
FIGS. 2-4 are drawings illustrating a two-way helical splitter, according to some embodiments of the present invention.
Figure 3:
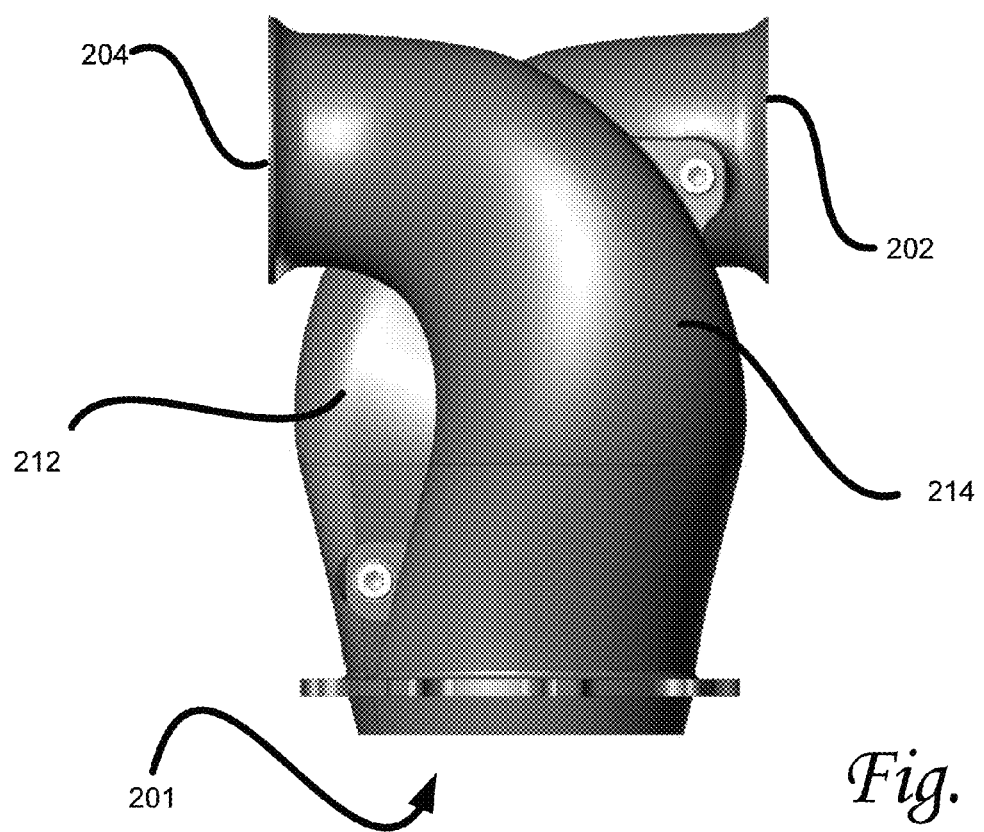
Figure 4:
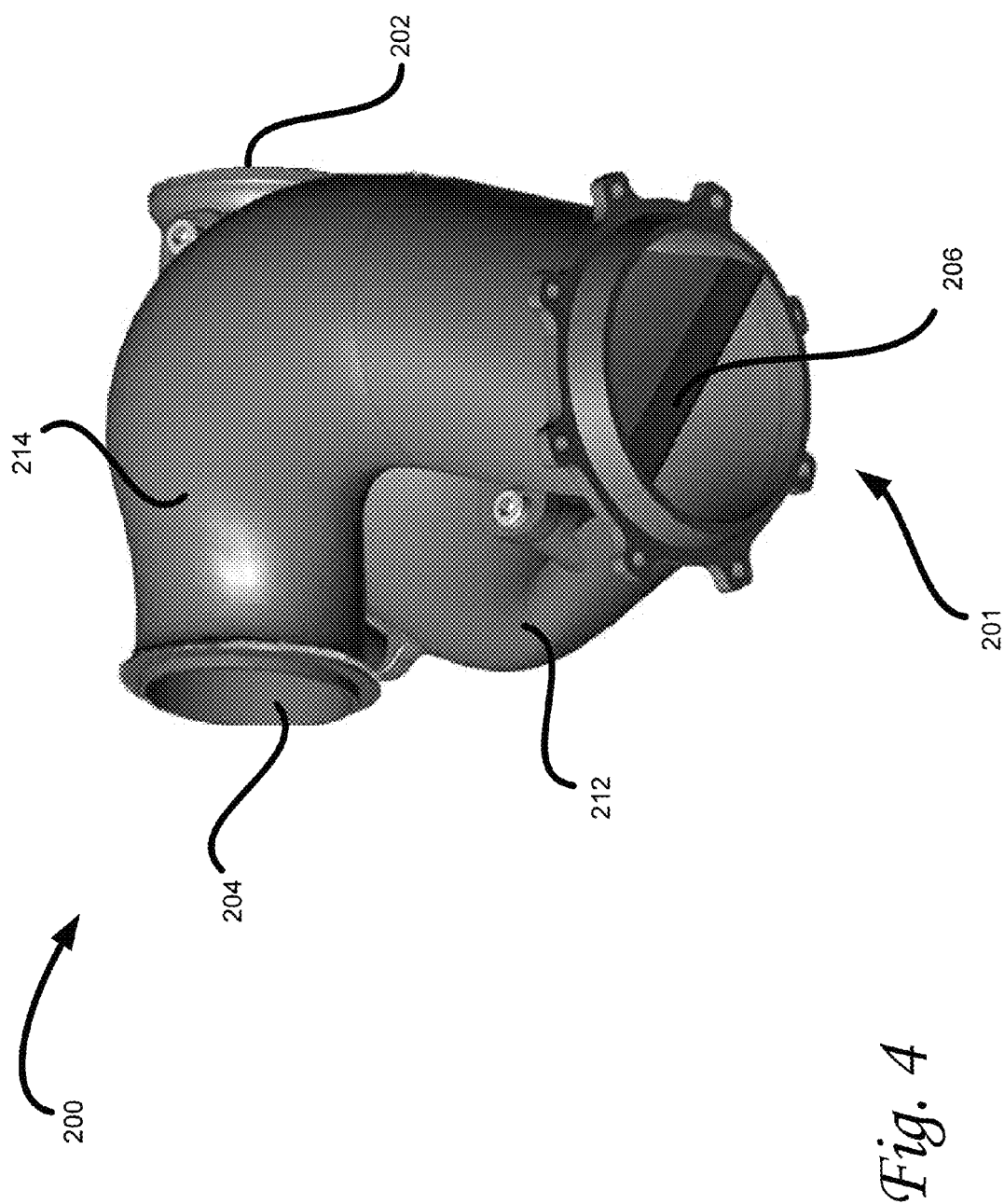

Referring now to FIGS. 2-4, drawings are provided illustrating a two-way helical splitter 200, according to some embodiments of the present invention. FIG. 2 is a top view of the splitter 200. FIG. 3 is a side view of the splitter 200. FIG. 4 is a perspective view of the splitter 200.

The splitter is a tube which includes an inlet 201 and two outlets 202 and 204. The flow is separated at the inlet by a panel 206 at the inlet. The panel 206 divides the cross-sectional surface of the inlet in two surfaces. Optionally, the inlet is circular or oval, and the panel divides the surface of the inlet into two D-shaped surfaces. The panel 206 is the interface at which two pipes 212 and 214 connect to form the intake 201. The first flow passes through the first pipe 212 to reach the first outlet 202. The second flow passes through the second pipe 214 to reach the second outlet 204.

Portions of the pipes 212 and 214 that are near the inlet are substantially helical, and the outlets 202 and 204 face away from each other at opposite directions. The helical portions of the pipes are intertwined with each other. In some embodiments of the present invention, central axes of the outlets form angles of about 90 degrees with the central axis of the inlet. In this manner, the flows are bent by about 90 degrees from the inlet to the respective outlets. Optionally, central axes of the pipes form an angle of about 180 degrees. The helical shape of the pipes 212 and 214 bends each fluid flow to soften the bend angle over a smooth, wide radius curve. The helical path enables maintaining a low curvature along the pipes 212 and 214, while reducing the spacing between outlets. Therefore, on the one hand, lower curvature improves the flow efficiency, decreases turbulence, and thus decreases the energy spent by the pump to pump the fluid from the fluid reservoir to the outlets. On the other hand, the reduced distance between outlets improves performance and handling of the personal propulsion system.

The panel 206 optionally has an aerodynamic shape, to reduce drag in the flow and to maintain a smooth flow through the splitter 200. In a non-limiting example, the lower edge of the panel 206 is shaped like a parabola where the vertex of the parabola is the lowest point of the panel (i.e., a point of the interface that is farthest from the outlets).

In some embodiments of the present invention, the outlets have oval shape. In a variant, each pipe smoothly morphs the D-shape at the entry into oval-like shape at the respective outlet. According to some embodiments of the present invention, the outlets have circular shapes. To achieve this shape, each pipe smoothly morphs the D-shape at the entry into an oval-like shape along the pipe, and then morphs the oval-like shape into a circular shape at the respective outlet.

In some embodiments of the present invention the cross sectional area in the pipes is maintained substantially constant in at least a portion of each pipe. This feature decreases turbulence and increases the efficiency of the fluid flows.

It should be noted that in some embodiments of the present invention, the inlet's cross-sectional area is split into two substantially equal portions by the panel. In a variant, the inlet's cross-sectional area is split by the panel into two unequal portions.

Figure 5:
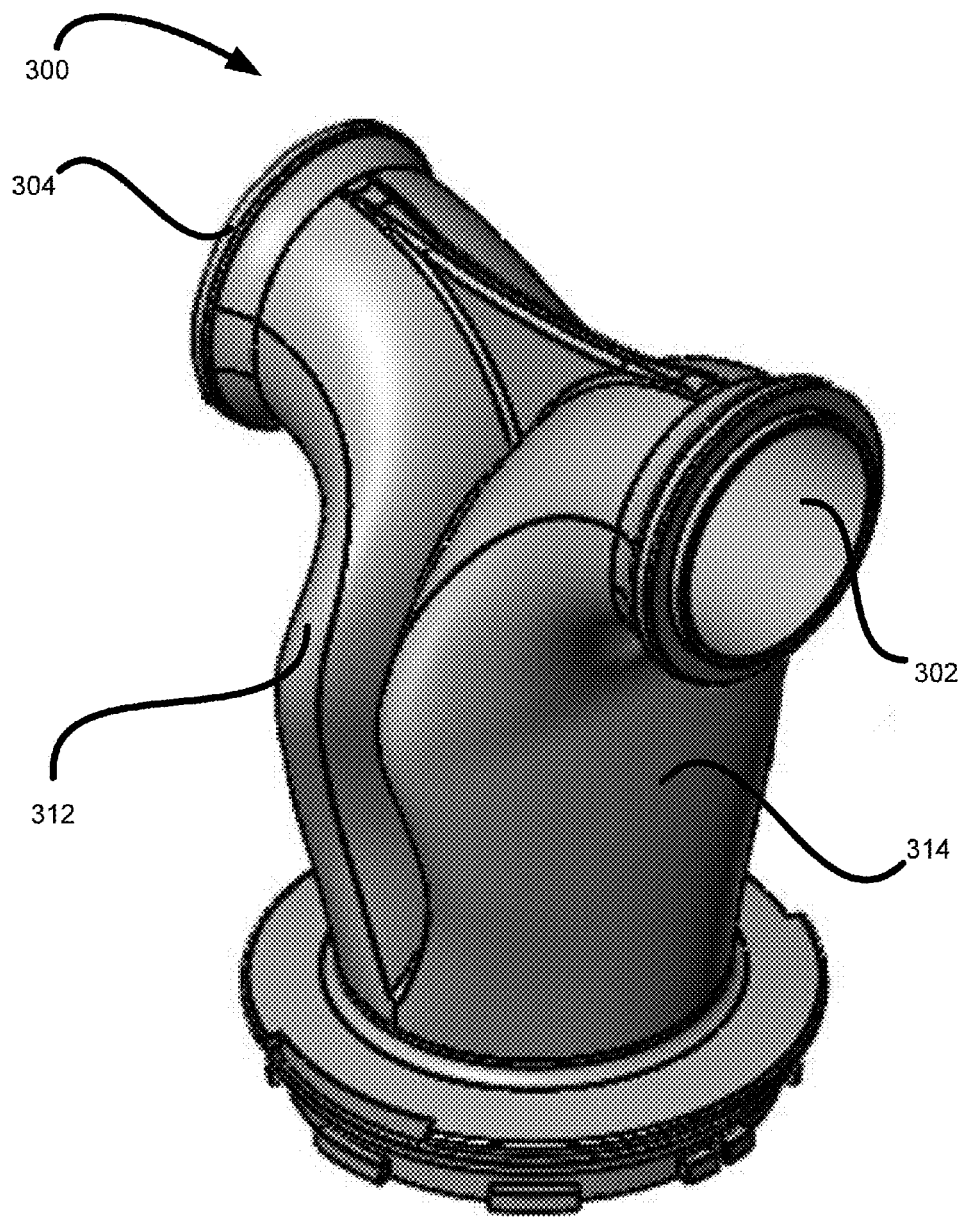
FIGS. 5-7 are drawings illustrating a flat splitter, according to some embodiments of the present invention.
Figure 6:
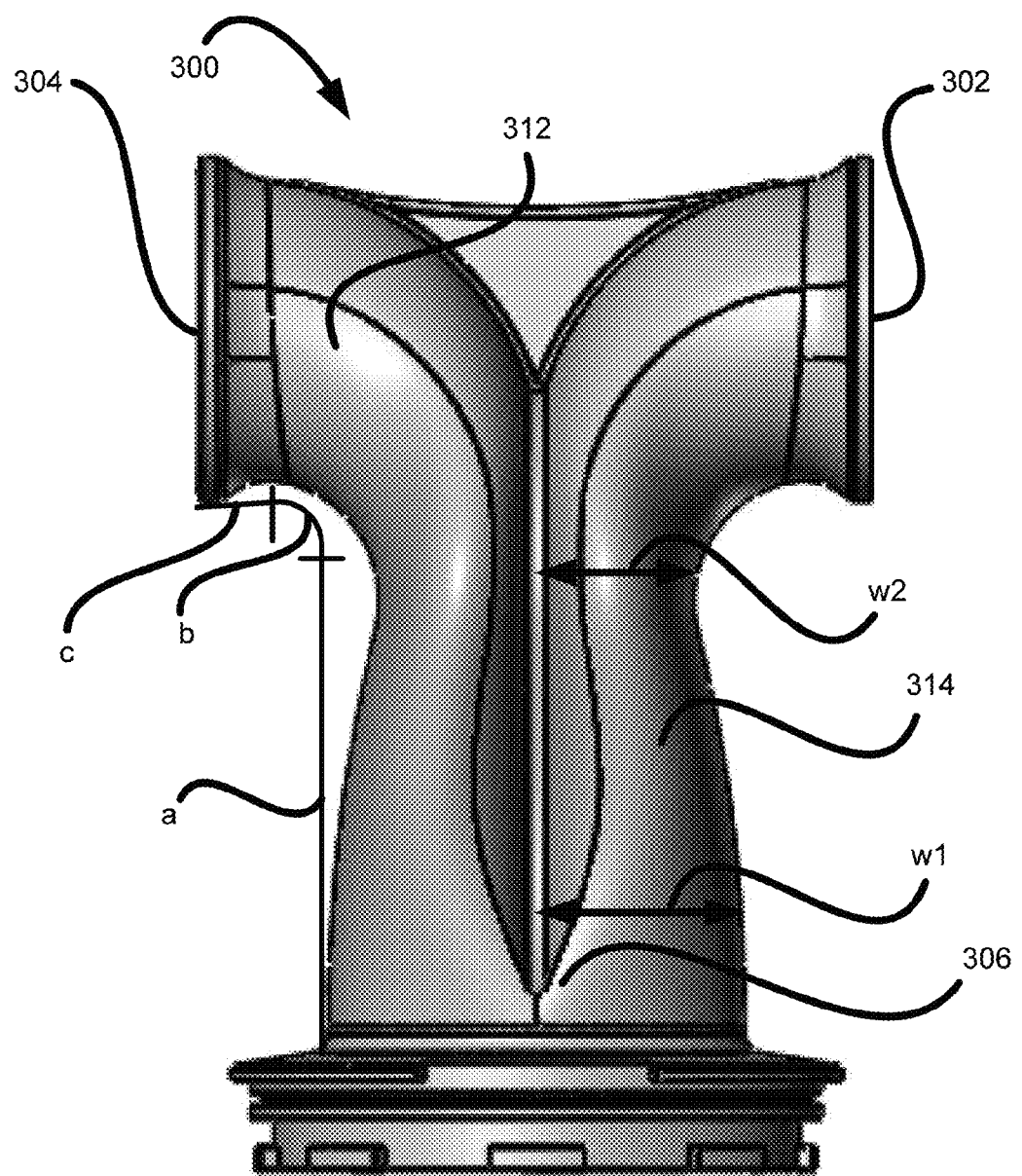
Figure 7:
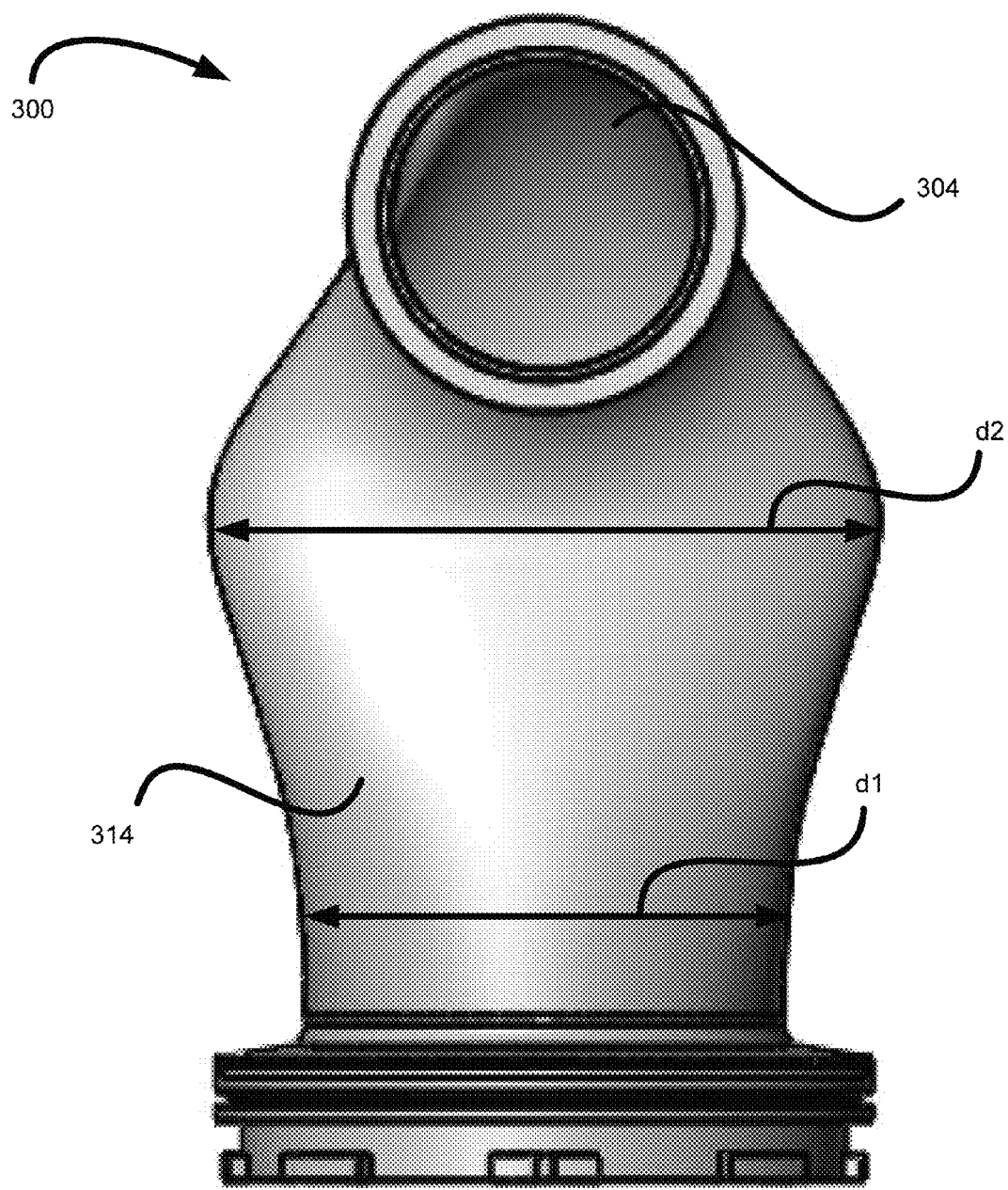

Reference is now made to FIGS. 5-7, which are drawings illustrating a flat splitter 300, according to some embodiments of the present invention. FIG. 5 is a perspective view of the splitter 300. FIG. 6 is a front view of the splitter 300. FIG. 7 is a side view of the splitter 300.

The flat splitter 300 is a tube which has an inlet 301 and two outlets 302 and 304. The flow entering the flat splitter is split at or just after the inlet, by a panel/interface 306 which divides the cross-sectional surface of the inlet into two parts. Optionally, the inlet is circular or oval, and the panel divides the surface of the inlet into two D-shaped surfaces. The panel 306 extends parallel to normal axis of the cross-sectional surface of the intake, and divides the tube into two pipes 312 and 314 having outlets 302 and 304, respectively. The pipes 312 and 314 extend side by side vertically away from the inlet and then curve away from each other and from the panel to release the respective fluid flows from the respective outlets 302 and 304 facing away from each other. Optionally the outlets' normal axes are at about 180 degrees from each other.

As it can be clearly seen in FIGS. 6 and 7, along the straight portions of each pipe, the width of the each pipe decreases while the depth of each pipe increases as the distance from the inlet grows. The width at any vertical point may be defined as the largest horizontal distance perpendicular to the interface/panel between the interface/panel and the inner surface of the pipe. A depth for any vertical point is the largest horizontal distance parallel to the interface/panel between two points at an inner surface of the pipe. For example, the width w1 near the base of the pipe 314 is larger than the width w2 located farther than the base of the pipe 314. The depth d1 (at the same point as the width w1) is larger than the depth d2 (at the same point as the width w1).

Because the width of the pipes narrows, the curvature of each pipe is gentler (i.e. having a larger radius of curvature) than the curvature of a pipe known in the art. As shown in FIG. 6, the shape of a pipe which is part of a two-way splitter known in the art having a decreased distance between outlets has a first straight portion a, a second curved portion b, and a third straight portion c. The curved portion b has a tight curvature (i.e., as a small radius of curvature), which compromises the flow efficiency of the fluid through the pipe. In contrast, the shapes of the pipes 312 and 314 describe gentler curves from the inlet to the respective outlets 302 and 314, without compromising flow efficiency, and enabling a narrow distance between the outlets.

As the width of each pipe decreases, the depth of each pipe increases, as can be seen on FIG. 7. The increase in depth ensures that the cross-sectional area of each pipe is maintained substantially constant along the pipe's length. As mentioned above, this feature helps reduce turbulence in the flow through the pipes.

Optionally, the panel 306 has an aerodynamic shape, to reduce drag in the flow and to maintain a smooth flow through the splitter 300. In a non-limiting example, the lower edge of the panel 306 is shaped like a parabola the vertex of which is the lowest part of the parabola.

In some embodiments of the present invention, the outlets have an oval shape. In a variant, each pipe smoothly morphs the flat shape near along the substantially straight section of the pipe to an oval-like shape at the respective outlet. According to some embodiments of the present invention, the outlets have circular shapes. To achieve this shape, each pipe smoothly morphs the flat shape near along the substantially straight section of the pipe to an oval-like shape before the outlets, and then morphs the oval-like shape into a circular shape at the respective outlet.

The shapes of the splitters 200 and 300 enable a decreased distance between the outlets, and therefore a decreased distance between the nozzles joined to the outlets. By using the splitters 200 and 300, the inventors have constructed a splitter having a diameter of about 4 inches at the inlet and a distance between outlets of about 6 inches. Using dual row 10 mm ball bearings to connect each outlet to a respective nozzle, the distance between the exits of the nozzles is below 27 inches.

Figure 8:
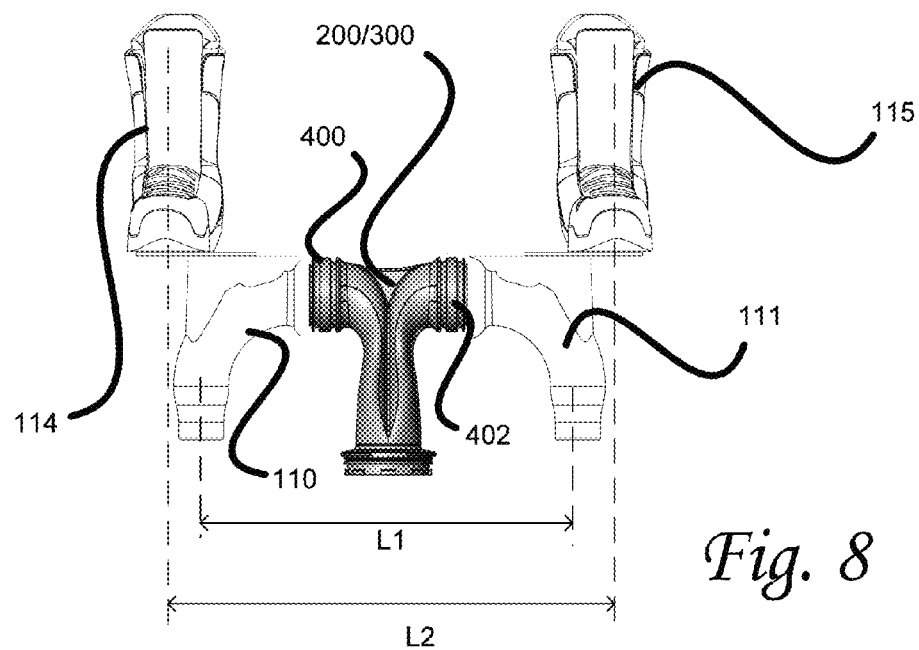
Figure 9:
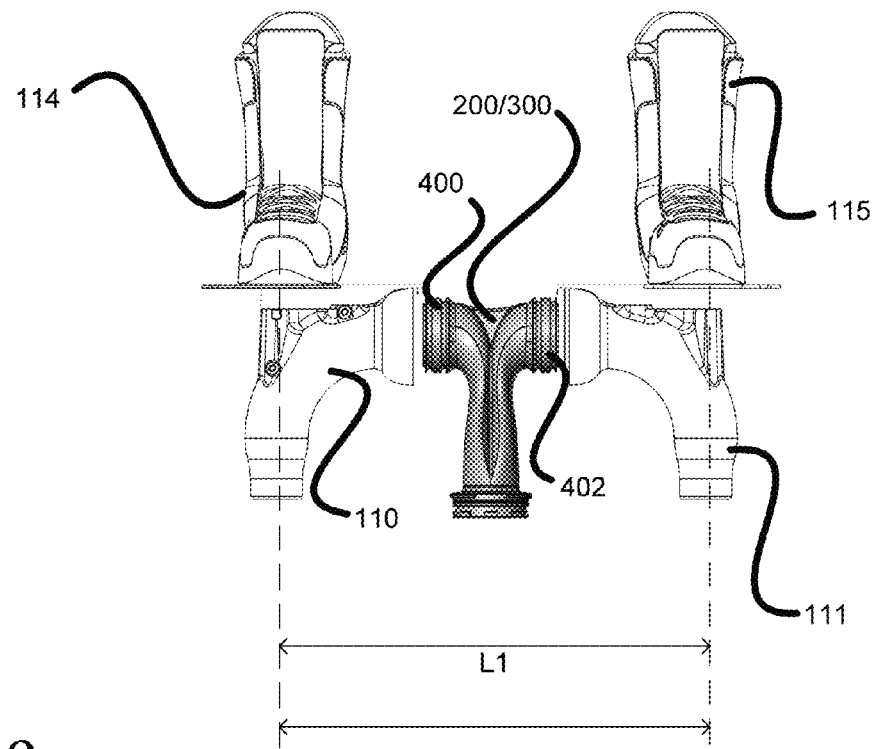
Figure 10:
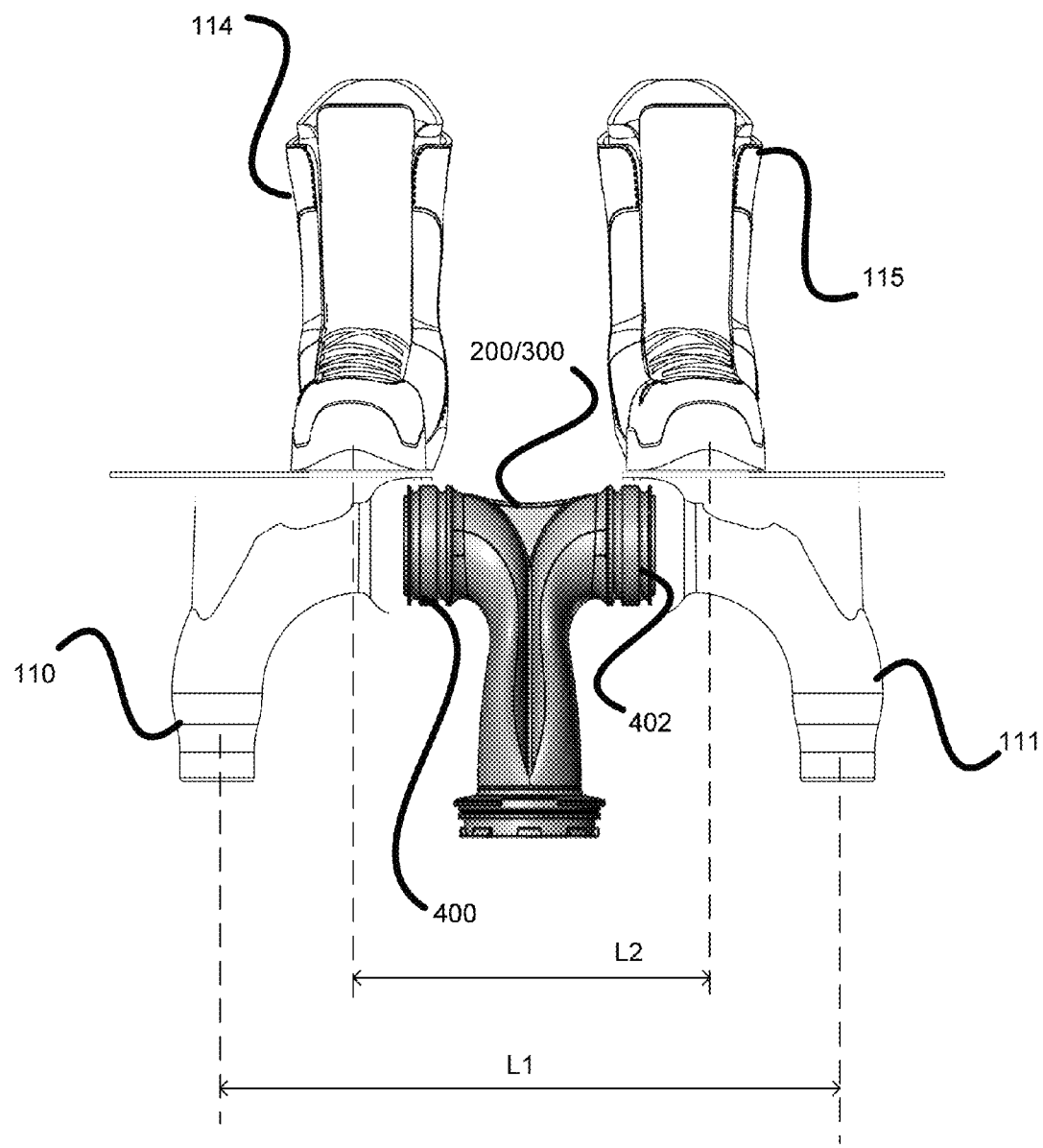

Referring now to FIGS. 8-10, schematic drawings are provided illustrating user-side apparatuses of a personal propulsion system, each having a respective different configuration of the foot mounts joined to the user's feet in. FIG. 8 illustrates an example in which the distance between the foot mounts is larger than the distance between the exits of the nozzles. FIG. 9 illustrates an example in which the distance between the foot mounts is about equal to the distance between the exits of the nozzles. FIG. 10 illustrates an example in which the distance between the foot mounts is smaller than the distance between the exits of the nozzles.

Figure 1:
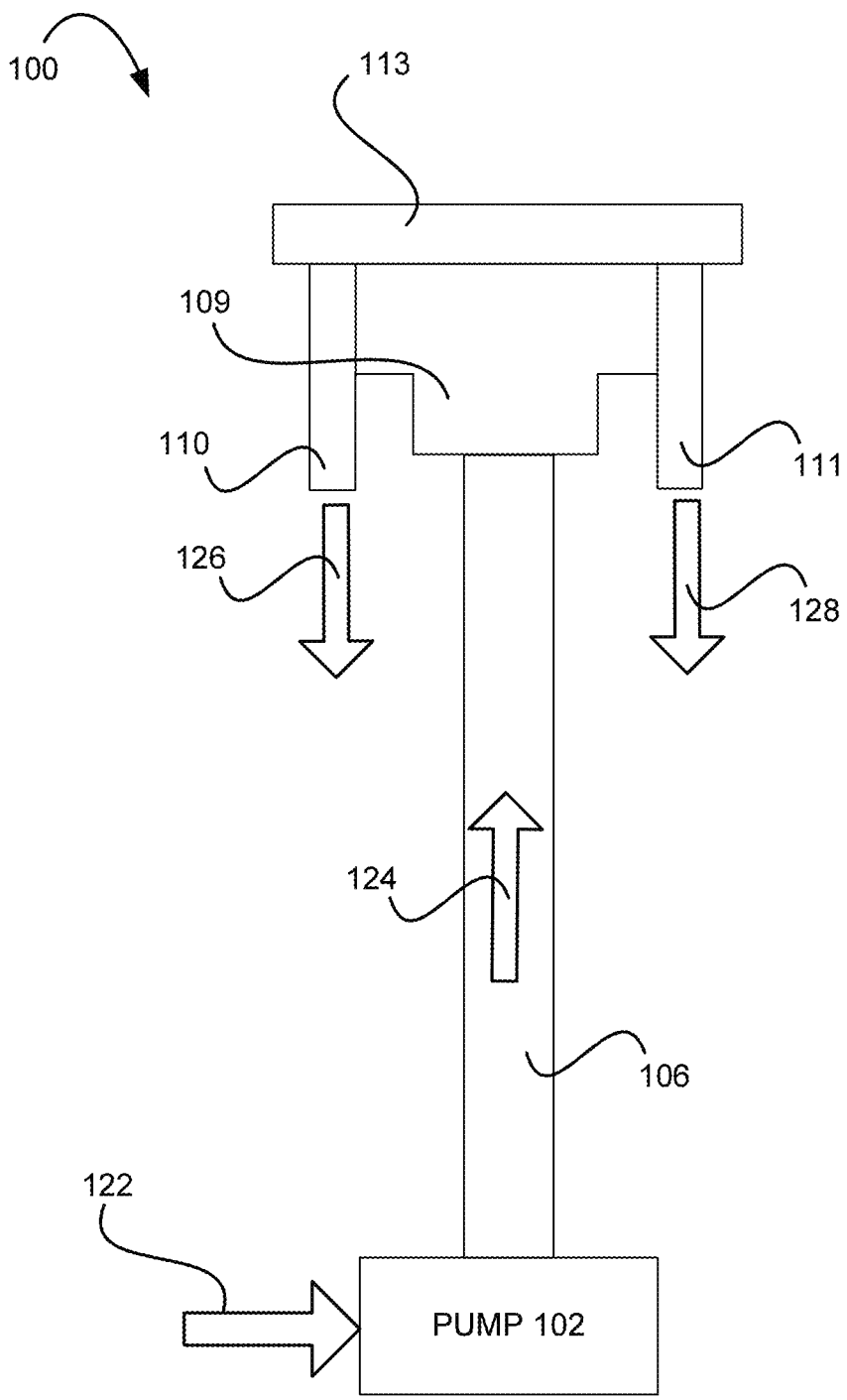
FIG. 1 is a schematic drawing illustrating a personal prolusion system, as known in the prior art.

Thanks to the decreased distance between the outlets splitters 200 and 300, the inventors have constructed and tested a personal propulsion apparatus in which the foot positions on the platform 113 of FIG. 1 are located right above the exits of the nozzles, without increasing the distance between the user's feet. In another embodiment, instead of using a single platform 113, the inventors have used foot mounts 114 and 115. The foot mounts 114 and 115 are joined to respective nozzles 110 and 111 and/or to respective bearings 400 and 402 (which may or may not be present), each bearing joining the respective nozzle to the respective outlet of the splitter. Each foot mount is located above a respective nozzle, such that the foot position on each foot mount is right above the exit of the respective nozzle. Using a splitter of the present invention having an inlet diameter of about 4 inches and an outlet distance of about 6 inches, as well as dual row 10 mm ball bearings attached to respective outlets, the inventors have designed a user side apparatus of a personal propulsion system in which the jets emitted by the nozzles are under the user's feet, and the user has a comfortable stance in which the distance between the user's feet and the distance between the jets are around 21.6 inches. In contrast, in the prior art, because of the large distance between the outlets of the splitter, aligning the foot with the exits of the nozzles, would require the user to spread the user's legs and maintain an uncomfortable stance while using the personal propulsion system. It should be noted that the distance between jets can further be decreased by either connecting the nozzles to the splitter without bearings, or by improving bearing design to decrease the size of the bearings.

Aligning the nozzles' exits (and therefore the source of thrust) with the user's feet causes a more predictable response to the user's control inputs. The user feels more "connected" to the personal propulsion system, and this makes the user feel more in control and stable.

As mentioned above, in some embodiments of the present invention, each nozzle is joined to the respective outlet of the splitter via a respective bearing. This bearing is configured for enabling a rotation of the nozzle with respect to the splitter. In this manner, the user is able to use his/her body stance to control the direction of the jets (i.e., the direction of thrust). Since the feet of the user are right above the exits of the nozzles, the weight of the rider is placed directly above the line of thrust. In this manner the load on the bearings is decreased, and the friction of the bearings' movement during use is decreased, thereby prolonging the lifetime if the bearings.

In some embodiments of the present invention, the decreased distance between the outlets of the splitter, enables the distance between exists of the nozzles to be smaller than the distance between the user's feet. For example, a splitter having an inlet having a diameter of about 4 inches and a distance between outlets between 4 and 6 inches, can be connected to two nozzles via respective dual row 10 mm ball bearings, in which the distance between the exits of the nozzles is below 20 inches. A jet span narrower than the user's stance can increase responsiveness and maneuverability of the personal propulsion system.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A flow splitter configured for splitting a first fluid flow into two second flows and for changing a direction of each second flow with respect to a direction of the first flow, the flow splitter comprising:
   an inlet, configured for receiving the first flow;
   a first pipe and a second pipe meeting at an interface and extending away from the inlet, such that the interface divides a first cross-sectional area of the inlet into two second cross-sectional areas;
   wherein:
      portions of the first pipe and the second pipe proximal to the inlet are substantially helical and are intertwined with each other;
      the first pipe and the second pipe have a first outlet and a second outlet respectively at ends of the respective pipes, the first and second outlet facing away from each other.

2. The flow splitter of claim 1, wherein central axes of the first and second pipe at the outlets form substantially right angles with a central axis of the splitter at the inlet.

3. The flow splitter of claim 2, wherein central axes of the first and second pipe at the outlets form an angle of about 180 degrees between each other.

4. The flow splitter of claim 1, wherein:
   a cross-sectional surface of the inlet is circular or oval, such that cross sectional surfaces of the pipes at the inlets are D-shaped;
   the cross-sectional surface of each pipe morphs from the D-shape into an oval shape at the respective outlet.

5. The flow splitter of claim 1, wherein:
   a cross-sectional surface of the inlet is circular or oval, such that cross sectional surfaces of the pipes at the inlets are D-shaped;
   the cross-sectional surface of each pipe morphs from the D-shape into an oval shape along the pipe;
   the cross-sectional surface of each pipe morphs from the oval shape along the pipe to a circular shape at the respective outlet.

6. The flow splitter of claim 1, wherein the interface is a panel extending between two points of a circumference of the inlet.

7. The flow splitter of claim 6, wherein the interface has an aerodynamic shape, configured for maintaining low drag in the second flows.

8. The flow splitter of claim 7, wherein the interface's larger surface has a parabolic shape and an edge of the interface proximal to the inlet has a frontal cross section perpendicular to the interface's larger surface, such that a vertex of the parabola is a point of the interface that is farthest from the outlets.

9. The flow splitter of claim 1, wherein a cross section of each pipe is constant along at least a portion of the respective pipe.

10. An apparatus for a personal propulsion system, the apparatus comprising:
    a flow splitter according to claim 3; and
    two nozzles attached to the respective outlets of the flow splitter, the nozzles configured for receiving the fluid from the flow splitter and having respective exits for emitting respective jets at angles substantially perpendicular to the central axes of the first and second tubes at the outlets;
    wherein a distance between the exits of two nozzles is equal to or less than 27 inches.

11. The apparatus of claim 10, further comprising two foot mounts, each foot mount being configured for being secured to a respective foot of a user, and each foot mount being joined to a respective nozzle and/or to a respective bearing which joins the respective nozzle to the respective outlet, wherein each nozzle exit is vertically aligned with a respective foot mount.

12. The apparatus of claim 10, further comprising two foot mounts, each foot mount being configured for being secured to a respective foot of a user, and each foot mount being joined to a respective nozzle and/or to a respective bearing which joins the respective nozzle to the respective outlet, wherein a distance between any nozzle exit and a central axis of the flow splitter at the intake is smaller than a distance between a center of any of the foot mounts and the central axis.

* * * * *